April 22, 1952     R. G. LE TOURNEAU     2,594,186
METHOD OF SHAVING GEARS
Filed Aug. 16, 1947     3 Sheets-Sheet 1
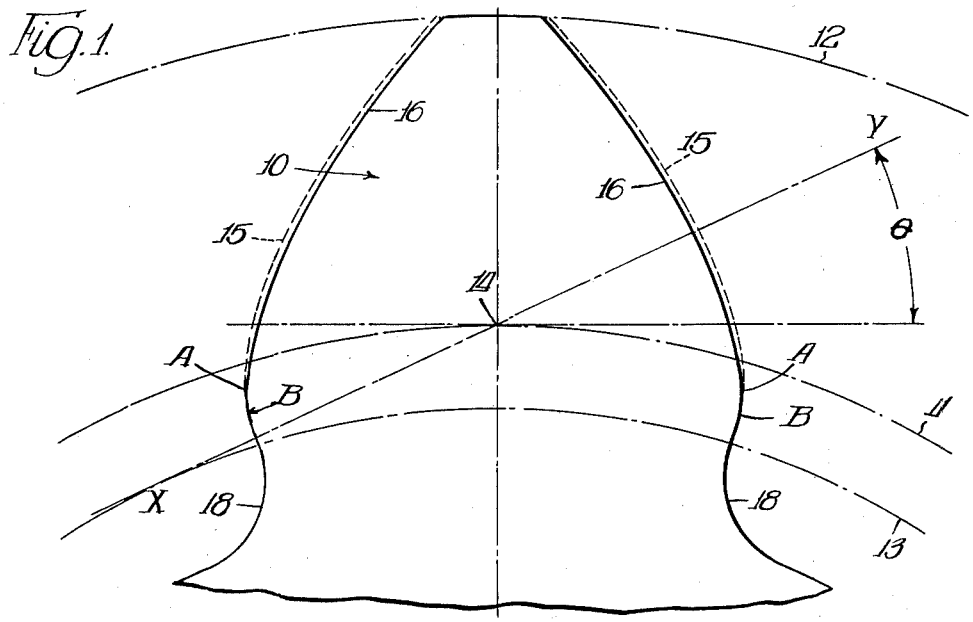
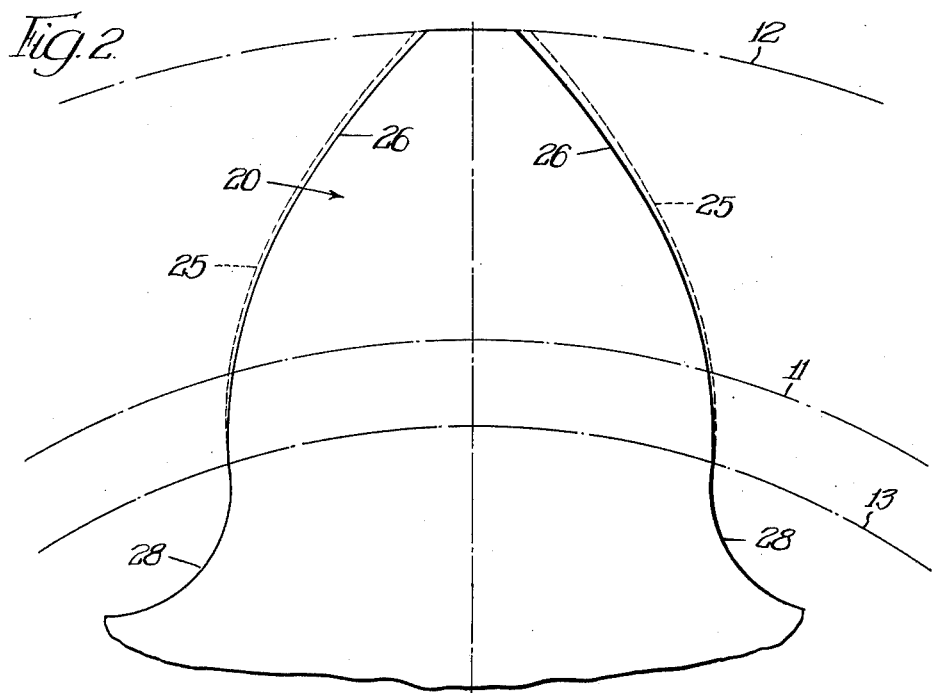
INVENTOR.
Robert G. LeTourneau,
BY April 22, 1952 R. G. LE TOURNEAU 2,594,186
METHOD OF SHAVING GEARS
Filed Aug. 16, 1947 3 Sheets-Sheet 3

INVENTOR.
Robert G. LeTourneau,
BY
Wilkinson Huxley, Byron & Hume
Attys.

UNITED STATES PATENT OFFICE 2,594,186

METHOD OF SHAVING GEARS

Robert G. Le Tourneau, Longview, Tex., assignor to R. G. Le Tourneau, Inc., Peoria, Ill., a corporation of California Application August 16, 1947, Serial No. 769,010

7 Claims. (Cl. 90—1.6)

The invention relates to gearing and has reference more particularly to improvements in the shape and contour of gear teeth for increasing the strength of the gear element by increasing the strength and durability of the individual teeth thereof.

One of the basic features of the present invention resides in the provision of a gear combination including a pinion and a gear, for example, wherein the pinion is favored, since it is the weaker of the two, by moving the pitch circles toward the base of the pinion teeth and farther out from the base of the gear teeth. This can be done by simply substracting from the outside diameter of the gear and adding a like amount to the outside diameter of the pinion, leaving the centers standard and running the cutter in full depth. Any amount can be so substracted and added within limits. However, the invention contemplates and has for a specific object the provision of a system which may be termed the one-three addenda system wherein the outside diameter of the pinion extends three addenda beyond its pitch circle and the outside diameter of the gear extends only one addendum beyond its pitch circle. With such a system it is possible to employ a seven tooth pinion and more than double the strength of the pinion.

A further object of the invention resides in a method of shaving the involute profile of the pinion teeth to secure a slightly crowned face, thus eliminating any possibility of a concentrated load at the ends of a tooth so that the safe load on the tooth can be somewhat increased. The present method of shaving is a radical departure from general practice since instead of using a conventional protuberance hob for initially shaping the pinion teeth, a cutter is employed having a twenty-four and one-half degree pressure angle and the pressure angle on each profile face of the tooth is then brought back to the desired standard of twenty-five degrees by means of a shaving operation. The material shaved from the profile faces of each tooth is progressively greater from a point of zero shave at the base circle to the top edge of the tooth and all this area is available for contact by the mating gear.

Another object of the invention is to provide an improved pinion and gear combination wherein additional strength is added to each gear element by the use of fillets of large radius at the base of the teeth. Large fillets reduce stress concentrations and improve the fatigue life of the teeth.

Another object of the invention resides in the provision of a gear characterized by stub teeth formed by a relatively short addendum and wherein the gear teeth are further reduced in depth as a result of a fillet of large radius between adjacent teeth. The reduced quantity of metal removed in cutting such gears as a result of the present design requires less machining time and thinner rims are possible which produce a gear of lighter weight.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a view illustrating the outline contour of a pinion tooth having a relatively long addendum;

Figure 2 is a view also illustrating in contour outline a pinion tooth incorporating the improvements of the present invention;

Figure 3:
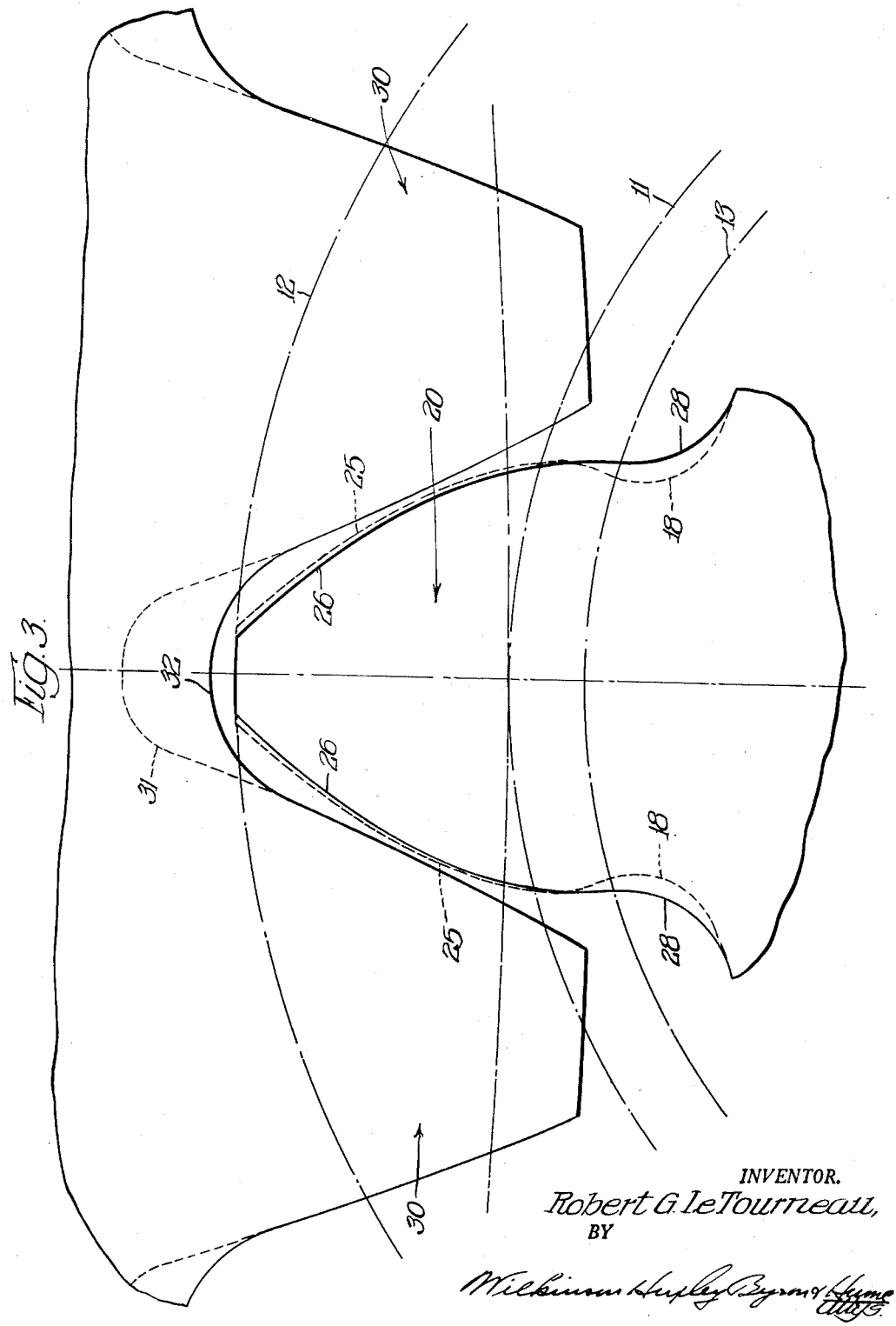
Figure 3 is a view showing the pinion tooth of Figure 2 in meshing engagement with a gear having teeth especially designed for the purpose.
Figure 4:
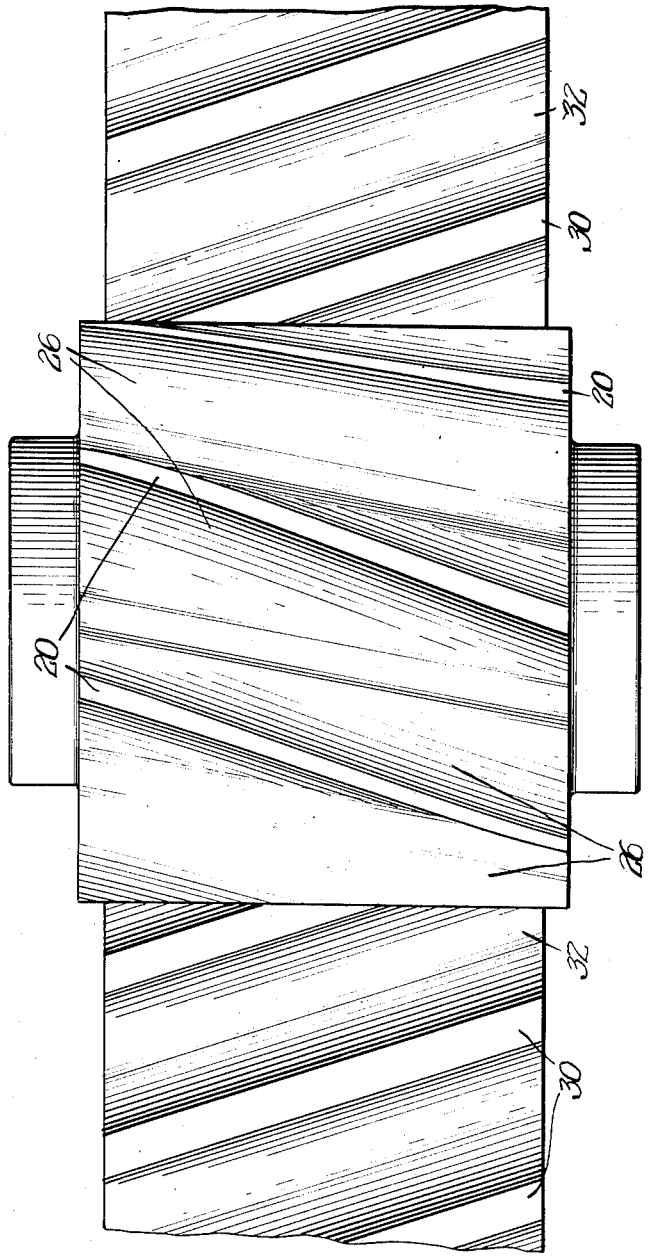
Figure 4 is a top plan view showing a pinion and gear combination which embodies the improved features of the invention.

Referring to the drawings, particularly Figure 1, the gear tooth disclosed for illustrating the invention and indicated by numeral 10 is characterized by a relatively long addendum which follows substantially the one-three system as previously described. More particularly, the long addendum may be described as approximately one-hundred and fifty per cent of standard where in standard is based on a whole depth of $$\frac{1.9}{D.P.}$$

and an addendum of $$\frac{.8}{D.P.}$$

with D. P. meaning diametrical pitch which is defined as the number of teeth on the gear per inch of pitch circle diameter. For example, considering the pinion tooth of Figure 1, as two diametrical pitch, then for every inch of the diameter of the pitch circle 11 the pinion will contain two teeth. The long addendum has been selected for small pinions in order to increase their strength and the invention contemplates that the amount added to the length of the tooth beyond its pitch circle will be subtracted from the tooth on the gear meshing therewith. If, as shown in Figure 1, the amount added to the pinion is approximately three addenda, then each tooth of the gear meshing with the pinion will extend only one addendum beyond its pitch circle. This is referred to as the one-three addenda system and for small pinions containing seven, eight and nine teeth the strength, as a result thereof, has been materially increased.

In the tooth shown in Figure 1 the numeral 12 indicates the addendum circle and 13 the base circle. The line of action x—y passes through 14, the point of tangency of the pitch circles, and is tangent to the base circle 13. The angle which this line of action forms with the common tangent to the pitch circles is known as the pressure angle and is indicated by $\theta$. The involute profiles 15 of the tooth 10 have been hobbed from a blank by using a protuberance hob having a pressure angle of twenty-five degrees and also having projections on each side thereof. The profile faces 15 of the tooth are therefore shaped to form a pressure angle of twenty-five degrees corresponding to that of the hob and the projections on the hob produce undercuts or cavities indicated by numerals 18 at the base of the tooth on the respective sides thereof. The profile faces of the tooth have been shaved for approximately .001 inch, as indicated by the full lines 16, and since said shaving is substantially uniform throughout the length of each involute face the pressure angle following the shaving operation remains at twenty-five degrees. It will be observed that the top of the undercuts 18 before shaving are at point A, at which point the involute profile stops and does not extend down farther. After shaving the top of each undercut has been lowered to point B. However, by reason of the cavity formed by the undercuts the tooth faces from B to the base circle 13 are not available for use by the meshing gear, all as clearly evident from the disclosure of Figure 3.

The tooth 20 shown in Figure 2 illustrates certain improvements of the invention which result in a wider tooth at the base with consequent lower stresses since stress concentrations are reduced. The gear tooth is characterized by a long addendum, approximately one hundred and fifty per cent of standard, wherein standard is based on a whole depth of $$\frac{1.9}{D.P.}$$

and an addendum of $$\frac{.8}{D.P.}$$

with D. P. meaning diametrical pitch. Said pinion has also been hobbed but in this case the hob has a pressure angle of twenty-four and one-half degrees and also has a full radius on top, or, in other words, the projections have been eliminated. The resulting profile faces 25, indicated by the dotted lines, therefore have a pressure angle of twenty-four and one-half degrees and the undercut or cavity on each side of the base of the tooth has been eliminated. Instead a relatively large radius fillet indicated by 28 has been formed at the base of the tooth on the respective sides thereof and which results in a materially wider tooth base with all the advantages accruing from the additional metal such as greater strength for resisting bending stresses. The larger radius of curvature of the fillet 28 gives lower stress concentrations and therefore adds to the durability and fatigue life of the tooth.

In accordance with the invention the tooth 20 is shaved progressively from a point of zero shave at the base circle 13 to the outer edge of the tooth at the addendum circle 12. By the shaving operation the hobbed pressure angle of twenty-four and one-half degrees on each profile face is brought back to the standard of twenty-five degrees and it will be noted that this shaving operation in combination with the large fillet 28 extends the involute profile to the base circle 13. The involute profile of the tooth has therefore been lengthened and the entire length of the same from the base circle to the top edge of the tooth is available for contact by the gear tooth meshing therewith. The previous system of employing a protuberance hob which formed the undersirable undercuts was due to the fact that the shaving cutter must have a hollow to run out in for proper operation. The system of the present invention gives the cutter a chance to run out simply by changing a twenty-four and one-half degree pressure angle to a twenty-five degree pressure angle.

The gearing combination of Figure 3 shows the long addendum pinion 20 of Figure 2 in mesh with a stubbed form of gear tooth 30 which has been developed for the pinion and particularly such pinions having seven, eight or nine teeth. The gear tooth 30 has been formed according to the one-three addenda system and thus it will be observed that the tooth is characterized by a short addendum approximately fifty per cent of standard. It will also be observed that the full depth of the tooth has been reduced by eliminating substantially all of the standard clearance between the root 31 of the gear and the pinion tooth. In shaping the gear tooth a hob is used having a full radius on the hob top which produces the maximum permissible fillet identified by numeral 32.

The stub tooth gear does not in any way affect the contact ratio or tooth operation when in mesh with a pinion having long addendum teeth as described. In addition the improved form of gear tooth has a number of desirable advantages. Less machine time is required in shaping the gear due to the reduction in the quantity of metal removed. The reduced tooth depth also permits thinner rims and therefore a lighter gear. The large radius fillet between adjacent teeth terminates excessive stress concentrations and as a result the fatigue life of the gear is improved.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. The method of forming teeth on a gear through the use of a hob having full radius cutters, and a shaving tool, which comprises: hobbing the profile of said teeth to the full depth and to produce fillets without undercutting at the base of the teeth, the hob producing a certain pressure angle on the tooth flanks, and thereafter shaving the flanks to produce a slightly greater pressure angle by removing progressively greater amounts of material from a point of zero shave adjacent the base circle to a maximum depth of shave at the tooth crests.

2. The method of forming gear teeth which comprises: hobbing the profile of said teeth to the full depth to produce fillets at the base of the teeth and thereafter shaving the flanks of the teeth by removing greater amounts of material from the outer portions of the tooth flanks than from the inner portions thereof, and progressively decreasing the amount of material removed as shaving progresses inwardly to substantially zero at a point of substantial tangency to said fillets.

3. The method of forming gear teeth on a pinion gear through the use of a hob and a shaving tool, which comprises: employing a hob free of protuberances to form a tooth profile to the full depth without undercuts and to produce fillets without undercutting at the base of the teeth and thereafter employing the shaving tool to shave the flanks of the teeth so formed by removing greater amounts of material from the outer portions of the tooth flanks than from the inner portions thereof, the shave depth running out to zero at a location adjacent the outer edge of the fillets.

4. The method of forming helical gear teeth on a pinion gear, which comprises: hobbing the profile of said involute teeth to the full depth to produce a certain pressure angle, and thereafter shaving the flanks of the teeth to produce a slightly greater pressure angle by removing greater amounts of material from the outer portions of the tooth flanks than from the inner portions thereof, and progressively decreasing the amount of material removed as shaving progresses inwardly to substantially zero at a point of substantial tangency to said fillets.

5. The method of forming a seven-tooth pinion gear which comprises: hobbing a pinion gear blank to the full depth to form involute tooth profiles with fillets at the base of the teeth to produce a certain pressure angle, and thereafter shaving the flanks of the teeth to produce a slightly greater pressure angle by removing progressively greater amounts of material from a point of zero shave near the base circle to a maximum depth of shave at the tooth crests the said fillets being substantially tangent to the flanks of the teeth at said point of zero shave near the base circle.

6. The method of forming a pinion gear having no more than nine teeth which comprises: hobbing a pinion gear blank to the full depth to form involute tooth profiles with fillets at the base of the teeth to produce a pressure angle of substantially 24½°, and thereafter shaving the flanks of the teeth to produce a pressure angle of substantially 25° by removing progressively greater amounts of material from a point of zero shave near the base circle to a maximum depth of shave at the tooth crests the said fillets being substantially tangent to the flanks of the teeth at said point of zero shave near the base circle.

7. The method of forming involute gear teeth on a pinion gear having no more than nine teeth which comprises: hobbing a pinion gear blank to the full depth with a hob having full radius cutters to produce fillets without undercutting at the base of the teeth, the hobbing operation producing involute teeth having a pressure angle of approximately 24½° and having an addendum approximately three times the dedendum, and thereafter shaving the flanks of the teeth to produce a pressure angle of approximately 25° by progressively removing greater amounts of material from a point of zero shave at the base circle to a maximum depth of shave at the teeth crests.

ROBERT G. LE TOURNEAU.

REFERENCES CITED

The following references are of record in the file of this patent:

UNITED STATES PATENTS

| Number | Name | Date |
|---|---|---|
| 1,787,590 | Olson | Jan. 6, 1931 |
| 1,813,875 | Fehr | July 7, 1931 |
| 2,195,097 | Scott | Mar. 26, 1940 |
| 2,354,670 | Drummond | Aug. 1, 1944 |
| 2,362,787 | Williamson | Nov. 14, 1944 |
| 2,392,803 | Austin | Jan. 15, 1946 |